United States Patent [19]

Mae

[11] Patent Number: 4,473,468

[45] Date of Patent: Sep. 25, 1984

[54] CISTERN FOR NATURAL PURIFICATION AND PLANKTON CULTIVATION

[75] Inventor: Takashi Mae, Toyama, Japan

[73] Assignee: Shizenkai Co., Ltd., Osaka, Japan

[21] Appl. No.: 495,327

[22] Filed: May 17, 1983

[30] Foreign Application Priority Data

May 17, 1982 [JP] Japan ..................... 57-81646

[51] Int. Cl.³ .......................................... B01D 23/16
[52] U.S. Cl. ................................. 210/167; 210/195.1
[58] Field of Search ............... 119/3, 2; 210/169, 234, 210/149, 195.1, 167, 602, 170

[56] References Cited

U.S. PATENT DOCUMENTS

| 1,200,126 | 10/1916 | Mitchell | 210/205 |
| 3,025,831 | 3/1962 | Berardi | 119/2 |
| 3,374,771 | 3/1968 | Michie et al. | 119/3 |
| 3,557,753 | 1/1971 | Dantoni | 119/2 |
| 3,983,843 | 10/1976 | Johnson | 210/169 |

Primary Examiner—Richard V. Fisher
Assistant Examiner—Sharon T. Cohen
Attorney, Agent, or Firm—Sughrue, Mion, Zinn, Macpeak and Seas

[57] ABSTRACT

A cistern or aquarium for fish inhabitation effects natural purification and plankton cultivation so as to imitate natural ocean systems. Water is made to rotate in the cistern, and water is drawn off for sand filtration and purification from upper and lower central positions of the cistern. The filtered water is passed through a sterilization bath including a sand layer containing plankton cultivation germ before being returned to the cistern. The invention eliminates the need of periodic water exchange in aquarium systems.

7 Claims, 5 Drawing Figures

CISTERN FOR NATURAL PURIFICATION AND PLANKTON CULTIVATION

BACKGROUND OF THE INVENTION

The present invention relates to a cistern having the functions of natural purification and plankton cultivation.

It is usually necessary for aquariums and the like to exchange old sea water or fresh water which is stained or tainted by ammonia and the like produced from bait, the excretion of fish, and dust and the like, for new sea water or fresh water in order for fish to inhabit the cistern or aquarium. Further, elaborate works are required for the exchange of sea water or fresh water, and therefore it has been very difficult to maintain and manage the aquariums and the like.

SUMMARY OF THE INVENTION

The object of the present invention is to artificially provide a small ocean ecosystem using a simply constructed cistern by applying the reults of our research with respect to the purifying operation occuring in natural oceans, whereby fish may indefinitely inhabit a cistern without any exchange of water or the use of medicines or chemicals.

DETAILED DESCRIPTION OF THE PREFERRED EMBODIMENTS

Figure 1:
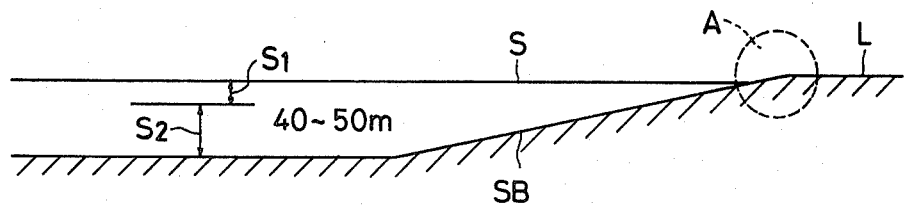
FIG. 1 schematically shows the purification function of a natural ocean.

Referring to FIG. 1, the natural purifying operation of the ocean will be explained. In FIG. 1, L denotes land; S, the surface of the sea; and SB, the bottom of the sea. In the region denoted by $S_1$ and having a depth of about 40-50 m from the surface S, various germs or microorganisms exist due to the impingement of sunshine, but in the region $S_2$ deeper than region $S_1$, the various organisms do not exist due to the fact that the sunlight scarcely reaches this region, and the plankton cultivation function of the deep sea and the sterilization function due to the plankton are effected. The sea water approaches the beach A in waves because of the current or tide and wind, and about two-thirds of the sea water is absorbed into the sand at the beach and the remaining one-third is returned back to the sea, leaving dust and the like on the beach. The dust and the various organisms on or in the sand are sterilized by the sun at ebb-tide. Thus the combination of the current or tide, the wind, the sand at the beach, and the sun together provide a mechanism for natural purification.

An object of the present invention is to achieve the same operation as in natural purification by an artificial and simple apparatus.

Figure 2:
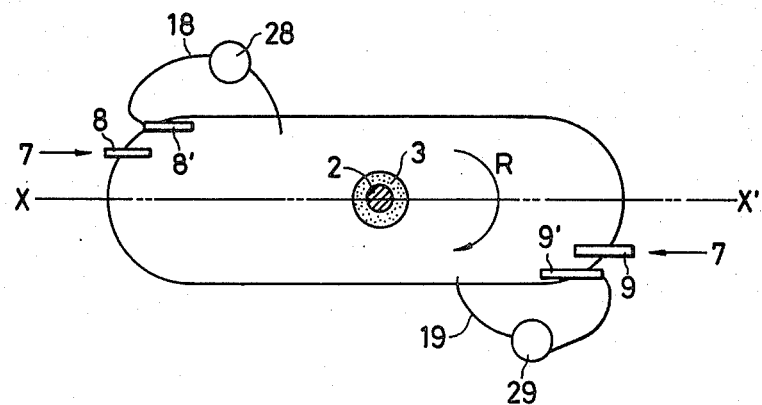
FIG. 2 is a plan view of a cistern according to the present invention.
Figure 3:
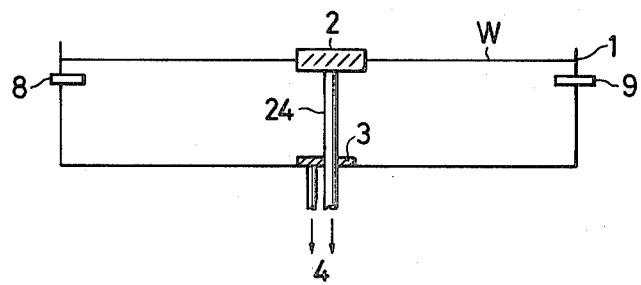
FIG. 3 is a sectional view taken along the line X—X' of FIG. 2.

Referring to FIG. 2, a cistern or tank for the inhabitation of fish is schematically shown, and FIG. 3 is a sectional view taken along the line X—X'. It is preferable to form the cistern in an ellipse-shape as shown in FIG. 2. The cistern 1 has two spout outlets 8 and 9 for the activated sea water or fresh water and an artificial current or tide as shown by arrow R in FIG. 2 is produced in the cistern to purify the water in the cistern. Fish generally have a habit of circulating against the direction of the current or tide, so that the fish generally circulate in the cistern in the direction reverse to the arrow R. Auxilliary spout outlets 8' and 9' may be additionally mounted on the cistern to increase the current in the cistern by circulating the water from the auxiliary outlets 8' and 9' through pipes 18 and 19 and pumps 28 and 29 respectively, when the operation of the spout outlets 8 and 9 are insufficient for the required speed of the current or tide. Due to the rotation of the water in the cistern 1, dust and the like are collected at the central bottom portion of the rotation, and ammonia and the like lighter than the dust are collected at the central surface portion of the rotation.

The dust, ammonia and other debris thus collected may be removed by an upper water collecting device 2 for collecting the water at the central portion of the water surface W (FIG. 3), and a bottom water collecting device 3 mounted at the central bottom surface of the cistern 1, respectively.

Figure 4:
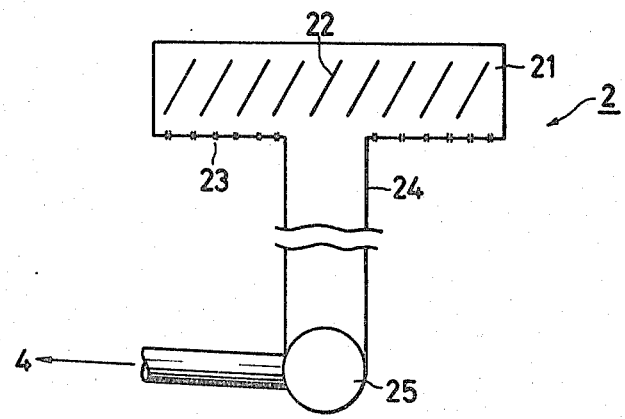
FIG. 4 schematically shows an upper water collecting device.

Referring to FIG. 4, the upper water collecting device 2 will be explained. A collecting head 21 is placed on the water surface W and is connected to a pump 25 through a pipe 24. A plurality of slanted slits 22 are provided at the peripheral portion of the head 21. If the water surface or level W becomes lower than the level of the slits 22, the motor of the pump 25 may be overheated, so that a plurality small holes 23 are also provided at the bottom portion of the head 21 to avoid this problem. Therefore, water can be collected through the small holes 23 even when the water level W is temporarily lower than the level of the slits 22 because of insufficient circulation of the water within the cistern 1, which may be produced by the blockage of the filtering portion of the purification cistern, as will be explained hereinafter.

Figure 5:
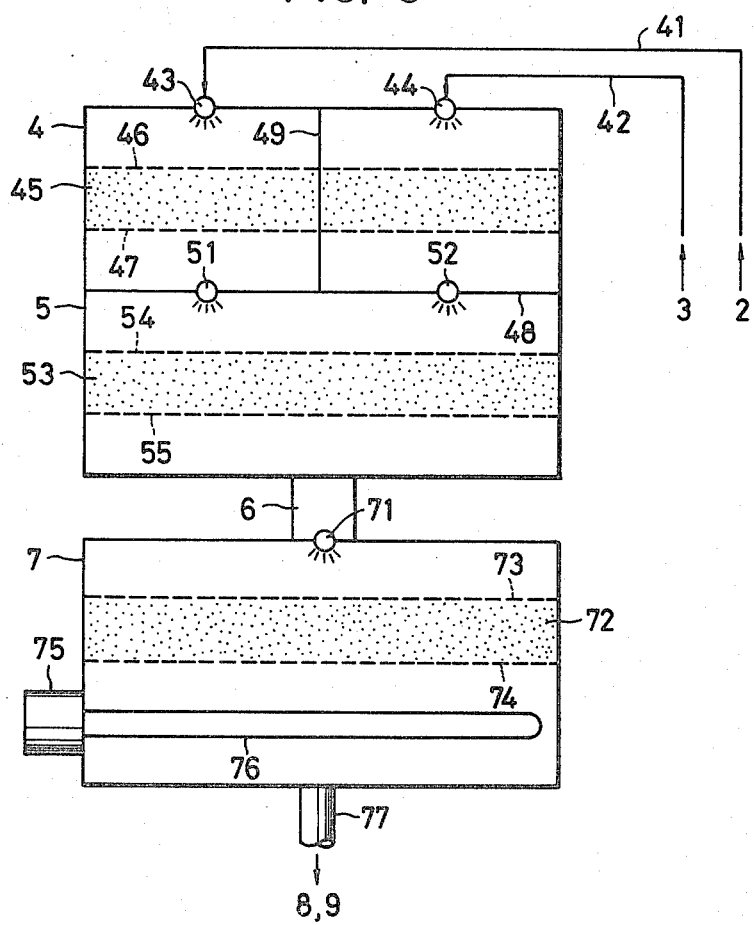
FIG. 5 shows an embodiment of the filter apparatus of the present invention.

Referring to FIG. 5, an apparatus having the function of purification and cultivation is shown. The water collected from the upper water collecting device 2 and the bottom water collecting water 3 is conducted to sprinklers 43, 44 of a first-stage purification bath 4 through pipes 41 and 42 respectively. A partition wall 49 may be provided so as to separate the upper water portion and the bottom water portion, thereby avoiding reverse washing and effecting convenience in the maintenance of the purification bath 4, but the provision of the partition wall 49 is not necessary. The water is passed through sand 45 provided between wire nets 46 and 47 acting as a filter. The sand 45 is composed of a combination of debris, sand, and activated charcoal.

The water passing through the first-stage purification bath 4 is conducted to a second-stage purification bath 5 through sprinklers 51 and 52 mounted on the bottom wall 48 of the first-stage purification bath 4. Sand 53 is similarly disposed between wire nets 54 and 55 and is used as a filter. There are provided back-washing devices within the sand layers 45 and 53 for preventing the blockage of the filters by periodic reverse-directional water flow washing. The back-washing device per se is well-known, and is thus not shown. If necessary, a level detector may be provided to actuate the back-washing device when the water level is increased by increasing filter blockage.

The water thus filtered is conducted from a sprinkler 71 to a plankton sterilization bath 7 through a pipe 6. Plankton cultivating germ is stored within sand 72 disposed between wire nets 73 and 74 of the plankton sterilization bath 7 to completely extinguish the various germ organisms in the water upon passing through the sand layer 72. The temperature of the water depends on the kind of fish inhabiting the water. The water temperature may be cooled to a desired temperature by disposing a coil 76 of a refrigerator 75 at the front or back of the sand layer 72.

Thus, the dust and various germs in the water are completely removed and extinguished, respectively, and the completely activated water is delivered to the outlets 8 and 9 of the cistern 1 of FIG. 2 through the pump and the pipe 77.

According to the present invention thus arranged, purification due to filtering is combined with the eradication of various germs due to plankton, and the upper water and the bottom water in the cistern are collected to effect such purification and sterilization without the conventional operation of exchanging the water and the addition of medicines etc. The water in the cistern may be supplied with sea water or fresh water, the amount of which is equivalent to the amount of evaporated water. The supplied water is not necessarily especially clean, and is thus easily available at any beach.

As stated above, according to the present invention, the functions of purification and sterilization are obtained by a simple apparatus, and in a manner similar to that naturally effected in the ocean.

What is claimed is:

1. A cistern for natural water purification, comprising; upper water collecting means for collecting water from the surface of the central portion of said cistern, bottom water collecting means for collecting water from the bottom portion of the central portion of said cistern, at least one purifying bath for filtering the water using a sand material, a sterilization bath for effecting sterilization of said sand-filtered water, means for returning the sterilized water to said cistern, and water outlet means mounted on said cistern for directing the water into said cistern so as to cause the water in said cistern to rotate.

2. A cistern according to claim 1, wherein said cistern is formed in an ellipse-shape.

3. A cistern according to claim 1, wherein the sand material of said purifying bath is composed of a mixture of debris, sand, and activated charcoal.

4. A cistern according to claim 1, wherein said cistern includes auxiliary outlet means including circulation means for assisting in rotating the water in said cistern.

5. A cistern according to claim 1, said sterilization bath comprising a sand layer including plankton cultivation germ.

6. A cistern according to claim 1, further including temperature control means disposed in said sterilization bath.

7. A cistern according to claim 1, said upper water collecting means comprising a surface skimmer.

* * * * *